United States Patent [19]

Tassen et al.

[11] Patent Number: 4,685,427

[45] Date of Patent: Aug. 11, 1987

[54] ALLOY FOR COMPOSITE TUBING IN FLUIDIZED-BED COAL COMBUSTOR

[75] Inventors: Curtis S. Tassen; Gaylord D. Smith, both of Huntington, W. Va.

[73] Assignee: Inco Alloys International, Inc., Huntington, W. Va.

[21] Appl. No.: 939,040

[22] Filed: Dec. 8, 1986

[51] Int. Cl.$^4$ .................. F22B 37/06; F22B 37/10
[52] U.S. Cl. ........................ 122/511; 122/DIG. 13; 122/235 C; 138/143; 165/180; 165/905; 420/448
[58] Field of Search ........... 122/511, DIG. 13, 235 C; 75/128 R, 128 M, 128 W; 165/180, DIG. 8; 138/143; 420/448

[56] References Cited

U.S. PATENT DOCUMENTS 3,969,153  7/1976  Suzuki et al. ............... 122/DIG. 13
4,505,232  3/1985  Usami et al. ........................ 122/511

Primary Examiner—Edward G. Favors
Attorney, Agent, or Firm—Raymond J. Kenny; Francis J. Mulligan, Jr.

[57] ABSTRACT

A composite tube structure having an inner substrate alloy and an outer, corrosion resistant alloy suitable for use in fluid-bed coal combustion reactors to form a water wall around at least a portion of the periphery of the fluid bed zone. The outer, corrosion resistant alloy centers around a composition of 0.1% carbon, 0.2% silicon, 0.5% manganese, 22% chromium, 3.8% aluminum, 0.4% titanium, 0.05% nitrogen, 0.2% molybdenum, 32% nickel, balance iron.

8 Claims, No Drawings

ALLOY FOR COMPOSITE TUBING IN FLUIDIZED-BED COAL COMBUSTOR

The present invention is concerned with an alloy and a composite tube having an external surface made from that alloy, which alloy has excellent resistance to high temperature oxidation, carburization and sulfidation and is stable over a wide range of temperatures.

BACKGROUND OF THE INVENTION AND PROBLEM

It is currently believed that certain pollution problems can be alleviated by resorting to the fluid bed combustion of coal in power generation. In this process coal particles are combusted while in violent motion in a bed fluidized by combustion air. In addition to coal, the bed is also provided with a material such as limestone in order to minimize sulfur dioxide in the exhaust gas. As a consequence, the fluidized bed contains not only coal, limestone and combustion air but also carbon monoxide, carbon dioxide, water vapor, nitrogen, fly ash, sulfur and sulfur oxides and hydrocarbon and carbonaceous products of combustion and pyrolysis. The fluidized bed also contains quasi-molten solids comprising mixtures of fly ash and calcium sulfate which can adhere to and coat structures in contact with the bed. Although combustion air is generally supplied in about 20% excess of that required to combust the coal, it is not unusual to measure $PO_2$ of $3 \times 10^{-12}$ to $10^{-16}$ and even to $10^{-22}$ in certain parts of the fluid bed rather than the $PO_2$ of $3 \times 10^{-2}$ suggested by the excess air present.

The fluid bed combustion of coal is generally designed to be carried out in a reactor where the containing walls comprise tubes carrying liquid water and/or steam which liquid water and/or steam is a medium for recovering thermal energy from the reactor. Regions of temporary or quasi-permanent low partial pressure of oxygen in the fluid bed coal combustor are most likely to be found adjacent the "water wall" tubes and in areas adjacent the coal feed mechanisms to the fluid bed. It is in these regions that water wall tubes and other structures can fail due to carburization, sulfidation or combinations of either or both of these mechanisms along with oxidation.

Those skilled in the art will appreciate that waterwall tubes in a fluidized bed coal combustion are boiler tubes and as such are governed by the requirements of the boiler code.

Boiler tubes must possess a combination of mechanical and corrosion resistant properties. Material requirements are defined in ASME materials specifications SA213, SB163, SA540 and ASME Code Case 1874. Corrosion resistant properties are equally as exacting if not more difficult to define. However, it is clear that the material of construction of choice for fluid-bed combustor tubing must possess corrosion resistance to sulfur-containing atmospheres under a wide range of oxygen partial pressures. Current materials of construction that are otherwise in compliance with the ASME specifications lack corrosion resistance to these atmospheres. This is true because most of these alloys develop chromia scales for corrosion protection. Below partial pressures of $PO_2$ of about $10^{-20}$ atm, chromia becomes unstable in carburizing atmospheres and below about $10^{-22}$ atm. in sulfidizing atmospheres depending upon the temperature and the actual partial pressure of the mixed oxidant. In alloy scale where chromia is diluted with nickel oxide, iron oxide and other oxides the effective $PO_2$ at which the chromia in the scale converts to chromium carbide can be as high as $10^{-10}$ or, more likely as high as $10^{-12}$ to $10^{-16}$ atm. Materials that possess corrosion resistance to these atmospheres either do not have the required mechanical properties or other code requirements for boiler tube applications. One solution is a composite tube with an inner core of an alloy meeting the boiler tube specifications for mechanical properties and an alloy for the outer layer which possesses corrosion resistance in the mixed oxidant environment of the coal fired, fluidized-bed combustor. Such an alloy must be highly compatible with the substrate alloy, readily fabricated and welded and must be resistant to thermal instability and the formation of embrittling phases at the interface between the two alloys.

It is the object of the present invention to provide such an alloy and to provide composite tubes, the outer layer of which consists of or comprises such alloy.

GENERAL DESCRIPTION OF THE INVENTION

The present invention contemplates an alloy having excellent resistance to oxidation and excellent resistance to carburization and sulfidation in atmospheres having a $PO_2$ of from $10^{-1}$ to $10^{-20}$ atm. and suitable for the outer layer of composite boiler tubes comprising or consisting essentially of, in per cent by weight, elements as set forth in Table I.

TABLE I

| Element | Broad Range | Advantageous Range |
|---------|-------------|--------------------|
| C | 0–0.4 | 0.01–0.2 |
| Si | 0–0.5 | 0.1–0.4 |
| Mn | 0–1.0 | 0.01–0.3 |
| Cr | 19.5–24.0 | 20–23 |
| Al | 3.2–4.4 | 3.5–4.2 |
| Ti | 0.1–1.0 | 0.2–0.6 |
| N | 0–0.2 | 0–0.15 |
| Mo | 0–0.5 | 0–0.4 |
| Ni | 30–35 | 31–34.5 |
| Fe | Bal. Essentially | Bal. Essentially |

Commercial alloys meeting all of the strength requirements of the Boiler Code such as INCOLOY TM alloy 800H and 310 stainless steel make suitable inner core materials for composite tubes. The alloys of the invention can also contain up to about 1% copper, up to about 0.3% rare earth metal (including yttrium), e.g., cerium, up to about 0.05% boron, and up to about 0.5% zirconium.

Alloys of the present invention as set forth in Table I can be made by casting to shape or by casting and then hot or hot and cold working to shape. Advantageously, however, when making a composite billet, the alloy is melted and gas atomized to form a powder. The powder is then formed in a layer around a hollow billet of core alloy and confined by a mild steel can or perimeter. The composite structure (hollow-billet, confined powder and can) is then hot worked, e.g., by extrusion, to form a hot worked composite tube with a mild steel coating. The mild steel coating is then removed by machining or etching either before or after sizing to final configuration. An example of a composite tube of the present invention is a tube 50.8 mm in OD having an outer wall about 1.78 mm thick of alloy of the invention and an inner wall of alloy satisfying the strength requirements of the boiler code about 4.6 mm thick. Those skilled in the art will appreciate that while coextrusion of a solid/powder composite billet is the method of making composite tubes found by the inventors to be most advantageous from their point of view, other means of making such composites can be employed. For example, both of the alloys in the composite tube can be formed as solid (as opposed to powder) hollow billets or tubes. The hollow structures are then nested and worked over a mandrel e.g., by co-extrusion or by tube drawing to form the composite with or without a layer of metal or alloy intervening. The alloy of the invention can also be flame or plasma sprayed onto a formed tube of an alloy meeting the strength requirements of the boiler code and thereafter finished to final configuration by working, machining, grinding, etc. For structures other than composite tubes, the alloy of invention can not only be cast to shape or cast and worked to shape but also can be formed by powder metallurgical methods. In this regard powder can be made by gas atomization or any of the methods generally describable as rapid solidification methods. The resultant powder can then be pressed, consolidated, compacted, sintered, e.g., by hot isostatic pressing, to near net shape of the object desired all as is well known in the field of powder metallurgy. Those skilled in the art will also appreciate that the alloy of the present invention can be used as a surface on any structure exposed to sulfidizing and carburizing atmospheres. Thus the invention contemplates not only composite boiler tubes but also composite sheets, plates, channels and other structures.

PARTICULAR DESCRIPTION OF THE INVENTION

Powder alloy of the present invention comprising particles less than 425 um was made by argon atomization to provide compositions in weight per cent as set forth in alloys Nos. 1 to 3 in Table II.

TABLE II

| Alloy No. | 1 | 2 | 3 | 4 |
|---|---|---|---|---|
| Carbon | 0.10 | 0.09 | 0.10 | 0.089 |
| Silicon | 0.24 | 0.19 | 0.20 | 0.074 |
| Manganese | 0.03 | 0.07 | 0.08 | 0.14 |
| Chromium | 20.73 | 20.63 | 20.50 | 20.38 |
| Titanium | 0.56 | 0.47 | 0.48 | 0.54 |
| Aluminum | 3.84 | 3.65 | 3.73 | 3.69 |
| Molybdenum | 0.20 | 0.18 | 0.19 | — |
| Nickel | 33.13 | 33.50 | 33.28 | 32.33 |
| Sulfur | 0.003 | 0.001 | 0.001 | — |
| Nitrogen | 0.005 | 0.011 | 0.01 | — |
| Oxygen | 0.004 | 0.003 | 0.006 | — |
| Iron | Bal. E | Bal. E | Bal. E | Bal. 42.57* |

*includes 0.25% Cu and 0.002% B

Composite tube, using the powders of the composition of alloys 1 to 3 set forth in Table II, was made by extrusion of a fabricated composite billet. The billet consisted of an inner well of INCOLOY ™ alloy 800 (approximately ⅔ of the billet radius), an outer wall of carbon steel (nominally 6 mm), and a cavity of approximately ⅓ of the radius of the billet filled with the powder. The fabricated billet was sealed under vacuum, given an extrusion preheat, typically 1149° C./2 hrs., and extruded using an extrusion ratio of 8 to 20/1. The carbon steel can is then pickled off and the resulting composite tubes are then drawn to final size, annealed and pickled. Alternatively the carbon steel can be replaced by a can of nickel-chromium-iron alloy having extrusion characteristics more akin to the billet alloys than does mild steel. After extrusion, the can material is removed by machining and/or grinding, e.g., centerless grinding. Alloy No. 4 in Table II was prepared by vacuum induction melting about 13.6 kg of the appropriate composition and casting. The cast billet was solution annealed at about 1177° C. for about 2 hours and subsequently hot worked to 15.9 mm rod. The alloy rod was given a final anneal at 1177° C. for 4 hours. Table III sets forth room temperature characteristics of samples of rod of alloy No. 4 as final annealed (with a hardness of 70 on the Rockwell B scale) and as annealed and aged as indicated.

TABLE III

| Aging Time*(h) | Temp °C. | 0.2% YS (MPa) | UTS (MPa) | El (%) | RA (%) |
|---|---|---|---|---|---|
| — | — | 205 | 618 | 57.0 | 64.4 |
| 600 | 538 | 219 | 692 | 40.0 | 46.2 |
| 600 | 594 | 250 | 634 | 51.0 | 61.2 |
| 600 | 649 | 551 | 911 | 17.0 | 17.8 |
| 600 | 760 | 405 | 883 | 22.0 | 26.9 |
| 600 | 871 | 278 | 762 | 32.0 | 42.1 |

*The alloy was air cooled after annealing or annealing and aging.

Table III shows that the alloy of the invention is stable vis-a-vis exposure to temperature in the range of about 500° C. to 900° C. Note that the alloy hardens somewhat upon exposure in the range of about 600° C. to 800° C. but that the ductility remains adequate even as hardened.

The alloys of the compositional range of this invention possess excellent corrosion resistance. Samples of alloy 4 were subjected to various corrosive environments as disclosed in Tables IV, V and VI. For comparative purposes the corrosion resistance properties of a substrate alloy are also provided.

TABLE IV

Oxidation Resistance

| Alloy | Temperature (°C.) | Environment* | Mass Change (mg/cm$^2$) | Time (h) |
|---|---|---|---|---|
| 4 | 649 | Air Plus 5% H$_2$O | 0.02 | 1008 |
|  | 871 | " | 0.45 | " |
|  | 999 | " | −0.54 | " |
|  | 1099 | " | −6.21 | " |
| INCOLOY ™ Alloy 800 | 871 | " | −1.74 | 504 |
|  | 999 | " | −14.14 | " |
|  | 1099 | " | −157.72 | " |

TABLE V

Carburization Resistance

| Alloy | Temperature (°C.) | Environment* | Mass Change (mg/cm$^2$) | Time (h) |
|---|---|---|---|---|
| 4 | 999 | H$_2$—1% CH | 0.30 | 600 |
|  | 1099 | H$_2$—12% CH$_4$—10% H$_2$O | 0.33 | 240 |
| INCOLOY ™ Alloy 800 | 999 | H$_2$—1% CH | 25.94 | 240 |
|  | 1099 | H$_2$—12% CH$_4$—10% H$_2$O | 23.46 | 240 |

TABLE VI

Sulfidation Resistance

| Alloy | Temperature (°C.) | Environment* | Mass Change (mg/cm$^2$) | Time (h) |
|---|---|---|---|---|
| 4 | 816 | H$_2$—45% CO$_2$—1% H$_2$S | 1.40 | 240 |
| INCOLOY ™ |  |  |  |  |

TABLE VI-continued

| | Sulfidation Resistance | | | |
|---|---|---|---|---|
| | | | Mass Change | |
| Alloy | Temperature (°C.) | Environment* | (mg/cm²) | Time (h) |
| Alloy 800 | 816 | " | −123.0 | 700 |

*The environments represent the specified materials reacted to equilibrium over a suitable catalyst.

The advantageous composition of this invention can be readily joined in thicknesses, at least up to 1.6 mm, by Gas Tungsten Arc Welding. Similarly, the composition is acceptable as a filler metal and and overlay. Both fine (ASTM grain size of two or less) and coarse (ASTM grain size of 0 or coarser) metal can be readily welded both autogenously and with matching filler metal. Weld quality based on liquid penetrant and radiographic inspection is excellent and defect free. Welds can be bent 180° (flattening) without fracture. Welding parameters are as follows:
Joint Design—Square Butt, No Gap
Current (DCEN)—80 Amperes
Voltage—10 Volts
Travel Speed—20 cm/minute
Electrode—1.6 mm diameter thoriated tungsten
Shielding Gas—Argon at 850 liters per hour
Backing Gas—Helium at 566 liters per hour Additionally, examples of alloys of the present invention are set forth in Table VII.

TABLE VII

| Alloy | C | Mn | Fe | Si | Cu | Ni | Cr | Al | Ti |
|---|---|---|---|---|---|---|---|---|---|
| 5 | 0.18 | 0.12 | Bal | 0.07 | 0.04 | 32.04 | 21.06 | 3.98 | 0.60 |
| 6 | 0.28 | 0.12 | Bal | 0.07 | 0.03 | 32.18 | 21.14 | 3.91 | 0.53 |
| 7 | 0.39 | 0.11 | Bal | 0.05 | 0.22 | 32.20 | 20.84 | 3.79 | 0.58 |

Alloys 5 to 7 were prepared as was alloy 4. Samples of these alloys were tested for stability in the same manner as was alloy 4 and room temperature tensile test results are set forth in Table VIII.

TABLE VII

| 1177° F./4H Anneal Plus Age Condition | 0.2% Y.S. (MPa) | U.T.S. (MPa) | El (%) | R.A. (%) |
|---|---|---|---|---|
| Annealed Only | | | | |
| Alloy 7 | 357 | 821 | 32.0 | 42.3 |
| Alloy 6 | 343 | 812 | 35.0 | 46.5 |
| Alloy 5 | 299 | 758 | 45.0 | 53.6 |
| Anneal Plus 538° C./600H/AC | | | | |
| Alloy 7 | 312 | 781 | 30.0 | 39.9 |
| Alloy 6 | 294 | 778 | 32.0 | 44.2 |
| Alloy 5 | 274 | 764 | 31.0 | 36.1 |
| Anneal Plus 649/600H/AC | | | | |
| Alloy 7 | 793 | 1181 | 17.0 | 26.4 |
| Alloy 6 | 798 | 1231 | 18.0 | 31.0 |
| Alloy 5 | 768 | 1190 | 17.0 | 18.3 |
| Anneal Plus 760° C./600H/AC | | | | |
| Alloy 7 | 427 | 858 | 25.0 | 37.0 |
| Alloy 6 | 419 | 875 | 26.0 | 38.4 |
| Alloy 5 | 424 | 891 | 26.0 | 40.7 |
| Anneal Plus 871° C./600H/AC | | | | |
| Alloy 7 | 343 | 815 | 26.0 | 38.8 |
| Alloy 6 | 339 | 818 | 29.0 | 45.0 |
| Alloy 5 | 316 | 801 | 30.0 | 48.6 |

The data in Table VIII like the data in Table III shows that alloys of the present invention are not detrimentally affected by exposure to moderately high temperatures over substantial periods of time.

The compositional ranges of elements in the alloys of the present invention are interrelated to provide the characteristics required for composite boiler tubing in fluid-bed coal combustors and in similar areas of use. Chromium and aluminum are held within the specified ranges because below these ranges the alloy suffers in oxidation resistance. Too high chromium invites formation of deleterious brittle phases. Too low aluminum reduces carburization resistance and sulfidation resistance in carburizing atmospheres. If alluminum is too high, the alloy becomes severly age-hardenable and difficult to work. Nickel is present to provide along with iron a stable austenitic matrix. Amounts of nickel above 35% in replacement of iron can be used but increase the cost of the alloy without significantly bettering any characteristic of engineering significance in the field of boiler tubes for fluid bed coal combustors.

While the present invention has been described with reference to specific alloys and composite tubes, those skilled in the art will appreciate that such are for purposes of exemplification and are not intended to limit the appended claims.

The embodiments of the invention in which an exclusive property as claimed are defined as follows:

1. A thermally stable hot-corrosion-resistant alloy comprising up to about 0.4% carbon, up to about 0.5% silicon, up to about 1% manganese, about 19.5% to about 24% chromium, about 3.2% to about 4.4% aluminum, about 0.1% to about 1.0% titanium, up to about 0.2% nitrogen, up to about 0.5% molybdenum, about 30% to about 35% nickel, up to about 1% copper, up to about 0.3% rare earth metal, up to about 0.5% zirconium, balance essentially iron.

2. An alloy as in claim 1 which contains about 0.01% to about 0.2% carbon and about 20% to 23% chromium.

3. An alloy as in claim 1 in the solution annealed condition.

4. A composite boiler tube having an inner wall made of an alloy meeting the specifications of the boiler code and an exterior wall made of a thermally stable, hot corrosion resistant alloy comprising up to about 0.4% carbon, up to about 0.5% silicon, up to about 1% manganese, about 19.5% to about 24% chromium, about 3.2% to about 4.4% aluminum, about 0.1% to about 1.0% titanium, up to about 0.2% nitrogen, up to about 0.5% molybdenum, about 30% to about 35% nickel, up to about 1% copper, up to about 0.3% rare earth metal, up to about 0.5% zirconium, balance essentially iron.

5. A composite boiler tube as in claim 4 wherein alloy of the exterior wall contains up to 0.2% carbon and 20% to 23% chromium.

6. A composite boiler tube as in claim 4 formed by coextruding a hollow billet of said alloy meeting the specifications of the Boilrt Code and a sheath of said thermally stable, hot-corrosion-resistant alloy.

7. A composite boiler tube as in claim 6 wherein said sheath is a sheath of powder alloy.

8. A composite structure with a substrate having superimposed thereon a layer of an alloy comprising up to about 0.4% carbon, up to about 0.5% silicon, up to about 1% manganese, about 19.5% to about 24% chromium, about 3.2% to about 4.4% aluminum, about 0.1% to about 1.0% titanium, up to about 0.2% nitrogen, up to about 0.5% molybdenum, about 30% to about 35% nickel, up to about 1% copper, up to about 0.3% rare earth metal, up to about 0.5% zirconium, balance essentially iron.

* * * * *